United States Patent [19]

Gulibon et al.

[11] 3,765,788
[45] Oct. 16, 1973

[54] ADJUSTABLE DOVETAIL BORING BAR
[75] Inventors: Robert S. Gulibon, Mt. Pleasant; James W. Heaton, Greensburg, both of Pa.
[73] Assignee: Kennametal Inc., Latrobe, Pa.
[22] Filed: Aug. 4, 1972
[21] Appl. No.: 277,875

[52] U.S. Cl. ............................................. 408/181
[51] Int. Cl. ........................................ B23b 29/034
[58] Field of Search................... 408/181, 185, 153; 279/6

[56] References Cited
UNITED STATES PATENTS
2,369,875   2/1945   Wanelik............................. 408/181

*Primary Examiner*—Gil Weidenfeld
*Attorney*—Melvin A. Crosby

[57] ABSTRACT

A boring bar having a shank with a head mounted on one end and with a dovetail tongue and groove connecting the head to the shank. A clamp screw extending through the groove and also through the tongue is provided for clamping the shank and the head together. A lever in the shank is pivoted on the clamp screw and engages the head and is pivotal on the clamp screw to adjust the head laterally on the shank.

10 Claims, 6 Drawing Figures

PATENTED OCT 16 1973　　3,765,788

ADJUSTABLE DOVETAIL BORING BAR

RELATED APPLICATIONS

United States Ser. No. 89,186, Filed Nov. 13, 1970, for "ADJUSTABLE DOVETAIL BORING BAR" - William C. Eversole and U.S. Ser. No. 130,190, Filed Apr. 1, 1971, now U.S. Pat. No 3,704,958 for "ADJUSTABLE BORING BAR" — Robert S. Gulibon et al.

The present invention relates to boring bars and is particularly concerned with a boring bar having a shank and a head adjustable on the shank, especially radially adjustable, and to a mechanism for adjusting the head on the shank.

Boring bars having adjustable heads are known but, heretofore, have been somewhat expensive to manufacture and have been lacking in the support of the head on the shank of the bar. For the reason that the head was not extremely rigidly supported on the shank, such boring bars have generally been used only for taking relatively light cuts.

The adjusting of the heads on the shanks always presents some difficulties, especially if fine adjustment of the head on the shank is desired. Boring bars of the nature with which the present invention is concerned are shown in the prior United States applications, Ser. No. 89,186, filed Nov. 13, 1970, for "Adjustable Dovetail Boring Bar", William C. Eversole, and Ser. No. 130,190, filed Apr. 1, 1971, for "Adjustable Boring Bar", Robert S. Gulibon, et al.

A primary object of the present invention is the provision of a boring bar with a shank and a head thereon which is adjustable laterally relative to the axis of the shank in which the head is extremely solidly supported on the shank while the head is positively prevented from becoming disengaged from the shank by the same screw which effects the clamping up operation, and wherein mechanism is provided for finely adjusting the head on the shank.

Another object of the present invention is the provision of an adjustable head boring bar structure, including adjusting means for moving the head on the shank, which is relatively inexpensive to manufacture.

Still another object of the present invention is the provision of a boring bar of the nature referred to in which the head can be positively adjusted in both directions on the shank.

These and other objects and advantages of the present invention will become more apparent upon reference to the following detailed specification taken in connection with the accompanying drawings in which.

BRIEF SUMMARY OF THE INVENTION

Figure 1:
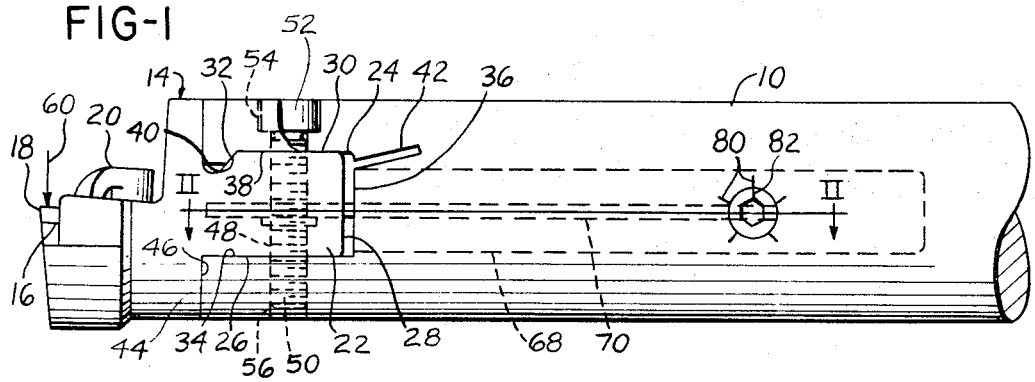
FIG. 1 is a side view showing a boring bar with adjustable head according to the present invention.

The present invention relates to a boring bar having a radially adjustable head thereon. The adjustable head is connected to the boring bar by way of a dovetail having a relatively wide angle and a clamp screw is provided for clamping the boring bar part of the dovetail connection to the part of the connection carried by the boring head and is arranged to extend directly through the dovetail portion carried by the adjustable head thereby providing for great strength and rigidity of connection of the head to the boring bar and eliminating the possibility of the head becoming disengaged from the boring bar during use.

The adjustment of the head on the shank is accomplished by a lever pivoted on the clamp screw and having a short end engaging the head and a long end extending into a bore in the shank and engaged on opposite sides by adjusting elements.

DETAILED DESCRIPTION OF THE INVENTION

Referring to the drawings somewhat more in detail, the boring bar illustrated therein comprises a shank portion 10 which is an elongated generally cylindrical member adapted for being clamped in a suitable support therefor in a machine tool. The work may rotate relative to the boring bar or the boring bar may be rotated relative to the work. The boring bar illustrated is adapted for either type of operation. Shank 10 preferably has flats formed thereon and extending longitudinally of the shank and providing convenient surfaces for nonrotatably clamping the shank fixedly to the support therefor.

At the one end, shank 10 carries a head 14 which is formed with a pocket 16 in which a cutting insert 18 is clamped as by a top clamp member 20.

The head 14 on the side thereof facing the shank 10 is flat and is provided with a rearwardly protruding lateral extension or tongue 22 adapted for being slidably received in a lateral slot or groove 24 in the adjacent end of shank 10. Tongue 22 advantageously has an axially extending planar bottom surface 26, a diametral rear surface 28 and a top surface which comprises an axial portion 30 remove from the head and an inclined portion 32 adjacent the head. The tongue 22 is thus in the form of a one-sided dovetail having an inclined surface on only one side thereof.

Shank 10 has a flat end thereon into which a diametral groove 24 is formed. The groove 24 is shank 10, similarly to tongue 22, has a bottom axially extending planar surface 34, a diametral rear surface 36, and a top surface comprising the axially extending portion 38 remote from the end of the shank and the inclined front part 40 adjacent the end of the shank and which is complementary to portion 32 of the top wall of tongue 22 on the head 14.

The boring bar, furthermore, includes a slot 42 extending generally axially of the boring bar from the bottom of groove 24 preferably at or near the juncture of the back wall 36 and portion 38 of the top wall of the groove 24 in the shank 10 of the boring bar. Slot 42 could be located anywhere along the back wall of groove 24 but is advantageously located as shown near the juncture of the aforementioned back wall and top wall portion of the groove for the reason that this location of the slot imparts the best action to the clamping up operation and likewise results in the strongest construction.

According to the present invention, the interengaging dovetail surfaces 32 and 40 are inclined at an angle of about 45 degrees to the axis of shank 10, although it will be understood that this angle could vary substantially within the purview of the present invention. The important thing about the angle of the inclined surfaces is that when the assembly is clamped together, the head be drawn toward the shank so the flat side of the head will firmly engage the flat end of the shank so the head will be exactly located and will be held against yielding, even under fairly high loads.

The flat end of shank 10 referred to is a planar end surface 44 and the flat side of the head 14 referred to facing shank 10 is a planar surface 46 for engagement with surface 44.

According to the present invention, the tongue 22 on the head of the boring bar is provided with a laterally elongated hole 48 to receive a clamp bolt 50 with clearance. Hole 48 could be in the form of a recess extending into said tongue from the rear end but is preferably in the form of a hole to keep the tongue as strong as possible.

Clamp bolt 50 has a head 52 receivable in a recess 54 provided therefor in the shank 10 in the region of the end of shank 10 adjacent head 14. Recess 54 is coaxial with a bore 56 in the shank which is threaded for receiving the threaded end of screw 50.

The location of screw 50 is of particular merit because it acts directly in the vicinity of the transverse plane of the inclined surfaces 32 and 40 and is thereby highly effective for drawing these surfaces tightly together, and, furthermore, for holding the surfaces in firm engagement once the screw has been tightened up.

Still further, the screw 50 passes through hole 48 with clearance and this is of particular merit because, if it should happen that the machine operator inadvertently forgets to tighten up the clamping screw, the head 14 cannot be thrown off from the shank 10 even when the boring bar is of the rotating type.

As mentioned, the screw holds the assembly tightly clamped together and this is of importance because it permits relatively heavy cuts to be taken by a boring bar according to the present invention without the load imposed on the insert carried by the head causing any tilting of the head on shank 10.

If the screw 50 were to be located rearwardly along a shank from head 14, as is the case in respect of certain other known types of adjustable head boring bars, one thereof being shown in the U.S. Pat. No. 3,433,104, there would be sufficient resilience in the assembly to permit the head to tilt under extremely heavy loads and this is, of course, highly objectionable.

The location of slot 42 near the top of the back wall of the groove in the end of shank 10 is important because the lower part of the boring bar remains a solid mass of metal and is, thus, in the best possible condition to sustain any thrusts imposed on the insert carried by the cutting head.

Assuming that the principal load on the cutting insert is downwardly as indicated by arrow 60 in FIG. 1, it will be evident that the tang on the top of the boring bar formed by the notch 42 and including at its outer end the wedge shaped portion that fits in the dovetail formed on the tongue 22 of the head, the said tang will be principally in tension while the surfaces 44 and 46 toward the bottom of head 14 will be placed principally in compression.

The disclosed arrangement thus forms an extremely strong and solid mounting for the head 14 of the boring bar and, furthermore, eliminates the possibility of injury to the shank 10 in the case of sudden shock loading on the head as can sometimes occur during machining operations when an insert breaks or when certain other unexpected events occur.

According to the present invention, the shank of the boring bar is provided with an axial bore 68 and pivotally mounted on clamp screw 50 is a lever 70 extending axially along bore 110 with clearance on each side thereof.

Lever 70 fits closely on clamp screw 50 and on the side is clamp screw opposite the part of lever 70 that extends into the shank of the boring bar and is a nose portion 72 fitting into a recess 74 provided therefor in the head 14.

The boring bar also carries a spring pressed plunger 76 engaging lever 70 on one side and an adjusting screw 78 that engages the lever on the side opposite the spring pressed plunger 76.

It will be evident that, upon loosening clamp screw 50, lever 70 can be caused to pivot about the axis of the clamp screw in one direction or another by rotation of adjusting screw 78 and that this will cause lateral shifting of head 14 on shank 10. Further, the distance between the point where portion 72 engages head 14 and the axis of clamp screw 50 is one-fifth the distance from the axis of the clamp screw to the point where adjusting screw 78 engages lever 70.

With the lever proportioned in the described manner, screw 78 can be a 40 pitch screw, so that one rotation of the screw will cause it to move axially 0.025 inches. With the lever proportioned in the described manner, this will produce lateral movement of the head in the amount of 0.005 inches.

Thus, by inscribing one of the shank 10 and the head of screw 70 with five marks, spaced uniformly circumferentially of the screw, and providing the other thereof with a single index mark, the amount of lateral adjustment of the head in thousandths of an inch can easily be determined. In FIG. 1, shank 10 has five marks 80 thereon and the head of screw 78 has a single mark 82 thereon.

Figure 3:
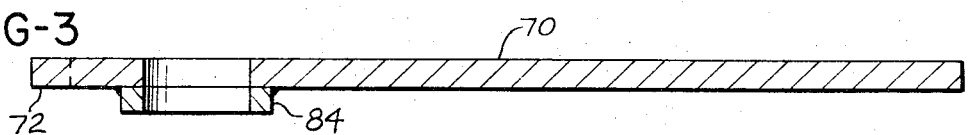
FIG. 3 is a sectional view through the adjusting lever.

FIG. 3 shows the lever 70 in cross section, and it will be seen to be a relatively thin bar-like member with an bushing 84 fixed thereto to increase the bearing of the lever on the clamp screw so that the lever is supported against tilting on the screw by the length of the said bearing, while being freely pivotal on the screw about the axis thereof.

Figure 5:
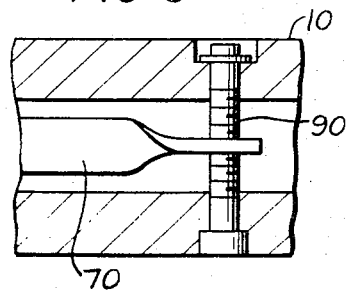
FIGS. 4, 5 and 6 show modifications of the adjusting mechanism of the present invention.
Figure 4:
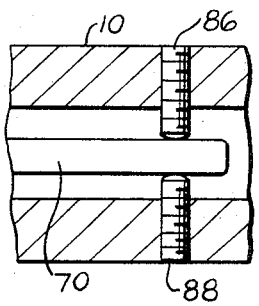
Figure 6:
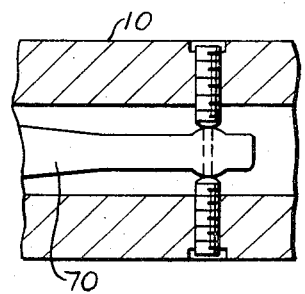

The described arrangement could be made positive in both directions of adjustment by providing opposing screws 86 and 88 threaded into the shank and engaging opposite sides of the long arm of lever 70. This modification is shown in FIG. 4. Positive adjustment of lever 70 can also be accomplished by threading a screw through the arm, as shown in FIG. 5, wherein screw 90 is threaded through the end of lever 70 and held rotatably in shank 10 but against axial movement therein. Also, a screw 92 with a circumferential groove engaged by the longer arm of lever 70, as shown in FIG. 6, could be employed for positive movement of lever 70 in both directions.

In most cases, it is adequate resiliently to urge the lever 70 in one direction and to move it in the opposite direction positively, as by screw threaded means but, as mentioned, if positive adjustment of the lever in both directions is desired, this can be accomplished in a number of different ways.

Assembly of the parts of the bar can be made easier by providing a slit in one side of head 14 to the right of line 94. This recess provides space to accommodate the end of lever 70 during assembly so that bore 68 does not need to be made deep enough to receive the entire length of the lever. However, if it is not desired to slit head 14, bore 68 can be made deep enough to receive the lever 70 during assembly.

Figure 2:
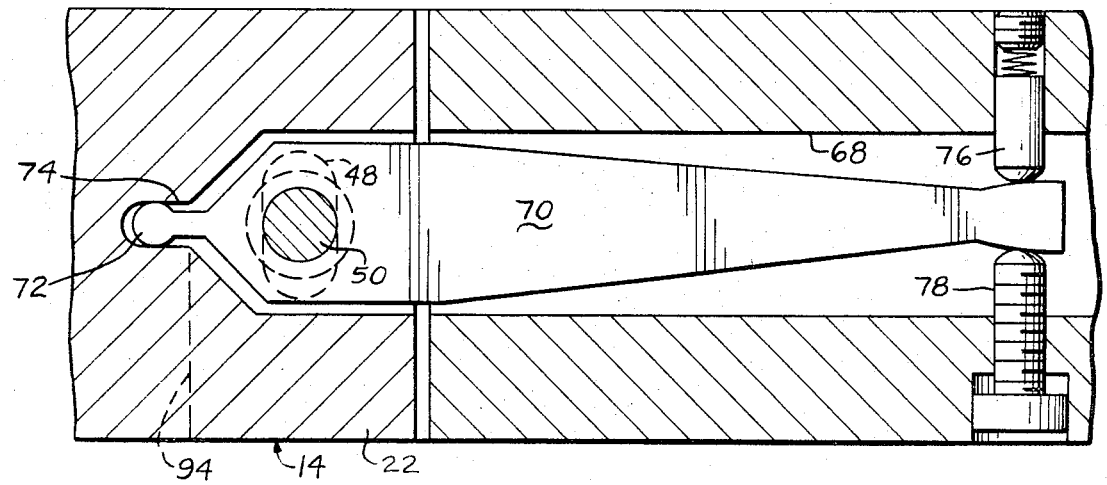
FIG. 2 is a fragmentary sectional view of the boring bar showing one form of the adjusting mechanism for the head.

The end of lever 70 may be twisted to receive a screw, as in FIG. 5, or may be made thicker to abut screws and plungers for the modification of FIGS. 2 and 4, or may to otherwise modified to meet the requirements of the particular adjusting device employed.

Modifications may be made within the scope of the appended claims.

What is claimed is:

1. A tool device comprising; first and second members, one of said members forming a support and the other thereof being adapted to receive a cutting element, a linear groove formed in said first member and a bar-like tongue on the other of said members slidably fitted into said groove, a clamp screw in said first member extending through said groove and also through said tongue at right angles to said tongue and groove, said tongue having an opening receiving said clamp screw and elongated in the direction of the length of said groove, a lever pivoted on said clamp screw and having a shorter end engaging one of said members and a longer end adjacent the other of said members, and means on said other member for tilting said lever about the axis of said clamp screw.

2. A tool device according to claim 1 in which said members comprise axial cavities in substantial registration, said lever extending axially in said cavities and journaled on said clamp screw, said lever having a shorter portion on one side of the axis of the clamp screw and a longer portion on the opposite side thereof, said shorter portion having the free end thereof rounded when viewed in the direction of the axis of said clamp screw, a socket in said one member closely fitting said rounded free end of the shorter of said lever, and adjustable means carried by the other of said members engaging the longer portion of said lever near the free end thereof for rotating said lever controlled amounts on the axis of said clamp screw.

3. A tool device according to claim 2 in which said adjustable means includes screw threaded means.

4. A tool device according to claim 2 in which said adjustable means comprises resilient means in said other member engaging the longer portion of said lever on one side and urging it in one direction of rotation about the axis of said clamp screw and a screw in said other member engaging the said lever on the side opposite said resilient means for adjusting the lever in the opposite direction.

5. A tool device according to claim 2 in which said adjustable means carried by said other member engages the longer portion of said lever at a point which is five times as far away from the axis of said clamp screw as the point of engagement of the rounded end of said shorter portion of the lever with said socket in said one member.

6. A tool device according to claim 3 in which said screw threaded means abuts both sides of said lever for positive adjustment thereof in both directions.

7. A tool device according to claim 2 in which said one member is said head and said other member is said shank.

8. A tool device according to claim 3 in which said screw threaded means is rotatably but nonaxially moveable in said other member and threadedly engages said lever.

9. A tool device according to claim 2 in which said adjustable means carried by said other member engages the longer portion of said lever at a point which is five times as far away from the axis of said clamp screw as the point of engagement of the rounded end of said shorter portion of the lever with said socket in said one member, said adjustable means comprising a screw, and cooperating elements of indicia on said screw and said other member adjacent said screw to indicate the position of adjustment of said screw in said other member.

10. A tool device according to claim 9 in which said one member is said head and said other member is said shank and said screw threaded means has a 40 pitch thread thereon.

* * * * *